United States Patent [19]
Xiang et al.

[11] Patent Number: 6,048,469
[45] Date of Patent: Apr. 11, 2000

[54] ADVANCED PHOSPHORS

[75] Inventors: Xiao-Dong Xiang, Alameda; Xiaodong Sun, Berkeley; Peter G. Schultz, Oakland, all of Calif.

[73] Assignee: The Regents of the University of California, Oakland, Calif.

[21] Appl. No.: 09/016,577

[22] Filed: Jan. 30, 1998

Related U.S. Application Data

[60] Provisional application No. 60/038,981, Feb. 26, 1997.

[51] Int. Cl.[7] .......................... C09K 11/54; C09K 11/62; C09K 11/85; C09K 11/80
[52] U.S. Cl. .......................... 252/301.6 R; 252/301.4 R; 252/301.4 H
[58] Field of Search ................... 252/301.4 R, 301.4 H, 252/301.6 R

[56] References Cited

U.S. PATENT DOCUMENTS 3,282,856  11/1966  Borchardt ............................. 252/301.4
3,870,650  3/1975  Ferri et al. ........................ 252/301.4 R

FOREIGN PATENT DOCUMENTS 55-131084  10/1980  Japan ............................... 252/301.4 R

*Primary Examiner*—C. Melissa Koslow
*Attorney, Agent, or Firm*—Townsend and Townsend and Crew LLP

[57] ABSTRACT

This invention relates to new phosphor materials and to combinatorial methods of synthesizing and detecting the same. In addition, methods of using phosphors to generate luminescence are also disclosed.

10 Claims, 5 Drawing Sheets

ADVANCED PHOSPHORS

CROSS REFERENCE TO RELATED APPLICATIONS

This application claims priority to U.S. Provisional Patent Application Ser. No. 60/038,981, filed Feb. 26, 1997, the teachings of which are incorporated herein by reference.

GOVERNMENT RIGHTS

This invention was made with Government support under Grant (Contract) No.DE-AC03-76SF00098 awarded by the U.S. Department of Energy. The Government has certain rights in this invention.

FIELD OF THE INVENTION

This invention relates to new phosphor compositions and to combinatorial methods of synthesizing and detecting the same. In addition, methods of using phosphors to generate luminescence are also disclosed.

BACKGROUND OF THE INVENTION

Phosphors are essential materials in lighting, imaging and display applications. Extensive research has been carried out on rare earth activated oxide phosphors because of their superior color purity and good chemical and thermal stability. However, despite these efforts, examples of oxide phosphors with superior properties are very limited. $Y_2O_3$:$Eu^{3+}$, discovered decades ago, is still the best red phosphor due to its high efficiency (97%), color purity (nearly single emission peak at ≈610 nm), and high thermal and chemical stability. It is currently used in tricolor lamps, field emission displays, projection TV displays, as well as other applications. The only drawback of $Y_2O_3$:$Eu^{3+}$ is that its emission peak is around 610 nm (orange-red region), which does not completely satisfy the requirement of saturated colors in full color displays.

A major challenge in materials science is the development of new phosphors for advanced display technologies. Although the photophysical processes leading to luminescence are well understood, luminescence efficiencies and stabilities depend upon complex interactions between the host lattice, sensitizer and luminescent center. Consequently, the discovery and optimization of new phosphors is still highly empirical. Given its highly empirical nature, the discovery of new phosphors is well suited to combinatorial synthesis techniques.

The automated synthesis and rapid screening of large numbers of compounds is known in the art as combinatorial synthesis (see, PCT Publication No. WO 96/11878 incorporated herein by reference). Using combinatorial methods, thousands and even millions of new compounds can be synthesized in rapid fashion. It is then possible to survey a large number of compositions in combinatorial libraries seeking compounds with desirable physical-chemical characteristics.

There remains a need in the art for new phosphors and better and more efficient processes for their discovery. The present invention fulfills this and other needs.

SUMMARY OF THE INVENTION

In one aspect, the present invention relates to a phosphor having the general formula:

$$(Gd_{2-a}Zn_a)O_{3-\delta}Eu^{3+}{}_b \quad (I)$$

In Formula I, the index "a" has a value greater than about 0.0, but less than about 2.0. The index "b" has a value greater than about 0.0, but less than about 0.2. The index "δ" will be understood by those skilled in the art to mean that the atomic ratio of elemental oxygen within the phosphor molecule is near 3, but may be less than 3 by an indeterminable amount. In no case is δ greater than 1.0.

In another aspect, this invention relates to a phosphor having the general formula:

$$LnAlO_pF_s:Activator_t \quad (II)$$

In Formula II, Ln is a lanthanide element or lanthanide element doped with an alkaline earth metal including, but not limited to, lanthanum$_m$; gadolinium$_m$; yttrium$_m$ or combinations of lanthanum$_m$ and strontium$_n$ or gadolinium$_m$ and strontium$_n$. In Formula II, the index "m" has a value greater than about 0.0, but less than or equal to 1.0. The index "n" is greater than about 0.0, but less than 1.0. In Formula II, "Activator" is a lanthanide cation including, but not limited to, $Eu^{2+}$, $Eu^{3+}$, $Tb^{3+}$, $Ce^{3+}$ and mixtures thereof. In Formula II, the sum of the index "p" and index "s" has the value "3+δ", wherein δ will be understood by those skilled in the art to mean that the atomic ratio of elemental oxygen and fluorine within the phosphor material is near 3, but may be greater than 3 by an indeterminable amount. In Formula II, the index "s" and the index "p" can be greater than or equal to zero, with the understanding that (p+s)=(3+δ). In Formula II, the index "t" is greater than zero, but less than 1. If the activator is a mixture of lanthanide cations, their amounts can be the same or different; however, their sum is not greater than 1.

In still another aspect, this invention relates to a method of generating luminescence, the method comprising irradiating a phosphor having the formula $(Gd_{2-a}Zn_a)O_{3-\delta}Eu^{3+}{}_b$ or $LnAlO_pF_s$:Activator$_t$, thereby creating luminescence.

In still yet another aspect, this invention relates to a method of generating a combinatorial phosphor library using a thin film deposition technique.

In yet another aspect, this invention relates to a method of generating a combinatorial phosphor library using a scanning multi-inkjet delivery system.

Other features, objects and advantages of the invention and its preferred embodiments will become apparent from the detailed description which follows.

DETAILED DESCRIPTION OF THE INVENTION AND PREFERRED EMBODIMENTS

I. Phosphor Materials

Figure 1:
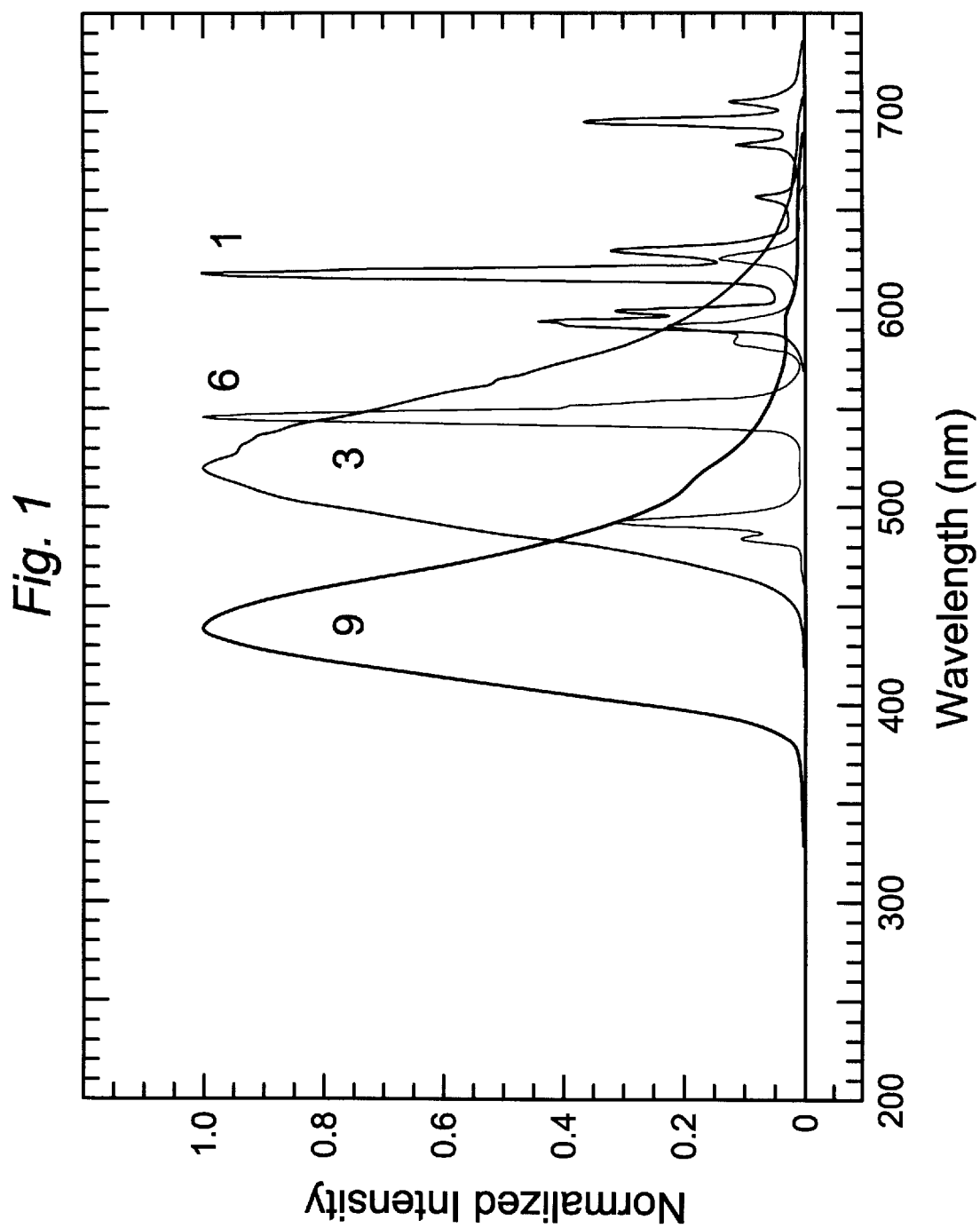
FIG. 1 illustrates photoluminescent spectra of $GdAlO_{3+\delta}$:$Eu^{3+}{}_{0.08}$ (sample 1, Table 1); $(Gd_{0.5}Sr_{0.4})AlO_{3+\delta}$:$Eu^{2+}{}_{0.10}$ (sample 3, Table 1); $GdAlO_{3+\delta}$:$Tb^{3+}{}_{0.04}$:$Ce^{3+}{}_{0.04}$ (sample 6, Table 1) and $LaAlO_{3+\delta}$:$Eu^{2+}{}_{0.16}$ (sample 9, Table 1) powder phosphors. Spectra were measured with F-4500 Hitachi spectrophotometer, exciting at the maximum absorption of each compound.

In accordance with certain aspects of this invention, there is provided europium-activated phosphor materials having empirical formula:

$$(Gd_{2-a}Zn_a)O_{3-\delta}:Eu^{3+}_b \quad (I)$$

wherein a, b and δ have been defined above. These europium activated gadolinium-zinc oxide compositions were discovered using combinatorial synthesis techniques described hereinbelow and which comprise further aspects of this invention. The europium activated gadolinium-zinc oxide compositions of this invention are red-emitting phosphors which are suitable for high-density electron bombardment and cathode-ray tube uses. In one preferred embodiment, the phosphors of this invention have better chromaticity than the standard $Y_2O_3:Eu^{3+}$, with its main emission peak at about 621 nm and a luminescent quantum efficiency of about 86%.

For some uses, these europium activated gadolinium-zinc oxide phosphors can be employed in conjunction with prior art europium-activated rare earth oxide phosphors in a uniformed blend.

In addition to the combinatorial synthetic methods described below, the europium activated gadolinium-zinc oxide phosphors can be made using conventional solid state synthesis methods. Using this synthesis method, the solution reagents (e.g., 0.5 M $Gd(NO_3)_3$; 0.5 M $Zn(NO_3)_2$ and 0.1 M $Eu(NO_3)_3$) can be reacted in proportion to their mole ratio given by the desired empirical formula. Next, the reaction mixture is dried, calcined in air at a temperature of at least 900° C. for approximately 12 hours. The resulting composition in crunched and finely ground and then sintered in air at about 1400° C. for about 10 hours to yield the desired product.

As is known to those skilled in the art, any light color can be color matched by forming an additive mixture of specific lights of three colors in a light source. This can be represented by using an intensity ratio of the primary colors and a X, Y, Z color specification system, wherein the intensity ratio is coordinate-transformed. This system uses chromaticity coordinates x and y to denote colors. In a preferred embodiment, the Commission International del'Eclairge (CIE) chromaticity of the europium activated gadolinium-zinc oxide compositions of this invention is x is 0.656 and y is 0.344.

The europium activated gadolinium-zinc oxide phosphors can be excited by electrons, low energy or high energy photons to emit bright red within the wavelength range of about 610 nanometers to about 622 nanometers. Thus, the phosphors are useful in a variety of luminescent devices, such as the tri-color cathode ray tube and low pressure mercury vapor discharge lamps and advanced display technologies, such as plasma, field emission and electroluminescence.

In another aspect, this invention relates to a class of phosphor materials based on rare earth refractory metal oxides and having the of empirical formula:

$$LnAlO_pF_s:Activator_t \quad (II)$$

wherein Ln, p, s, t and Activator have been defined above. These phosphors have been identified using combinatorial synthesis methods.

In one preferred embodiment, a rare earth refractory metal oxide phosphor is red-emitting, wherein Ln is Gd (gadolinium) and the activator is $Eu^{3+}$. The optimized red phosphor, $GdAlO_{3+\delta}:Eu^{3+}_{0.08}$, has a quantum efficiency of 85%. The CIE chromaticity of this optimized europium-activated gadolinium acuminate is x is 0.613 and y is 0.358.

In another preferred embodiment, the rare earth refractory metal oxide is a europium di-cation activated blue-emitting phosphor, wherein Ln is La (lanthanum). The phosphor, $LaAlO_{3+\delta}:Eu^{2+}_{0.16}$, is an especially preferred blue emitting phosphor. The CIE chromaticity of this europium-activated lanthanum acuminate is x is 0.158 and y is 0.119.

In yet another preferred embodiment, rare earth activated refractory metal oxides phosphors can be green light emitting. In one instance, green emitters occur when Ln is Gd or La and the activator is $Tb^{3+}$ or $Ce^{3+}$, or in another instance, when Gd or La are doped with Sr and the activator is $Eu^{2+}$.

In a preferred embodiment, the phosphor $(Gd_{0.5}Sr_{0.4})AlO_{3+\delta}:Eu^{2+}_{0.10}$ has a quantum efficiency of 97%. The CIE chromaticity of this optimized europium-activated gadolinium-strontium acuminate is x is 0.270 and y is 0.586.

II. Combinatorial Synthesis of Phorphor Materials

A. Thin Film Methods

Thin-film deposition techniques in combination with physical masking techniques or photolithographic techniques can be used to deposit thin-films of various reactants on predefined regions of substrates. For an overview of the various thin-film deposition techniques which can be used in the present invention, see, e.g., *Handbook of Thin-Film Deposition Processes and Techniques*, Noyes Publication (1988). Using multi-composition material libraries of thin film phosphors, suitable phosphors compositions were identified.

In order to generate combinatorial libraries of thin film phosphors of Formulae I and II, sequential RF sputtering depositions of thin film precursors and combinatorial physical masks were used. In this method, thin-films of various reactants can be deposited on the substrate using glow-discharge processes in combination with physical masking. In RF sputtering, a plasma of energized ions is created by applying a high RF signal between a cathode and an anode. The energized ions from the plasma bombard the target and eject atoms which are then deposited on a substrate.

For Formula I, compositions were desired which had the following formula: $A_mB_nC_kO_x:R_b$, wherein A is a lanthanide element, such as Gd (gadolinium), La (lanthanum), or Y (yttrium); B is Ta (tantalum), Zr (zirconium), W (tungsten), Mo (molybdenum), or Zn (zinc); and C is Al (aluminum), Mg (magnesium), or Sr (strontium); R is a rare earth element such as Tm (thulium), Eu (europium), Th (thorium), or Ce (cerium); the indices m, n, and k independently range from 0 to 1, b ranges from 0.005 to 0.1, and x depends on stoichiometries of specific compositions to maintain charge neutrality. The sputtering targets, which were greater than 99.9% pure, included $GdF_3$, $La_2O_3$, $Y_2O_3$, $Ta_2O_5$, Zr, $WO_3$, Mo, ZnO, $Al_2O_3$, MgO, $SrCO_3$, $TmF_3$, $EuF_3$, $TbF_3$, and $CeF_3$.

Libraries with 128 different compositions or stoichiometries were deposited on 1 inch×1 inch polished (100)

LaAlO$_3$ single crystal substrates. The amount of precursors deposited was monitored in situ with a quartz crystal thickness monitor. Subsequent analysis with a profilometer revealed that film thickness of each precursor varied less than 5% over a two inch diameter area. Using this method, three identical libraries were made simultaneously and processed at different partial pressures of O$_2$, H$_2$, He and Ar and temperatures ranging from 1100° C. to 1400° C. for up to 4 hours. The refractory nature of precursors used in these libraries precludes significant changes in stoichiometry due to thermal evaporation. The effects of heat treatments under various partial gas pressures (e.g., reduction or non-reduction) were found to be reversible. Photoluminescence images of these libraries under broad wavelength UV irradiation (Hg lamp) were obtained by color photography.

Color photography of the phosphor libraries can provide an immediate comparison of photoluminescence brightness and chromaticity between thin film samples of different nominal compositions and processing conditions.

In addition to the compounds of Formula I, new tricolor thulium phosphors were identified and comprise yet another aspect of this invention. These thulium activated thin film samples have the following nominal compositions: La$_{1.2}$AlTa$_{0.5}$O$_x$:Tm$_y$ (0.005<y<0.075), LaZrO$_x$:Tm$_y$ (0.005<y<0.055), and LaTaAl$_{1.3}$MgO$_x$:Tm$_{0.005}$. After processing at 1375° C. for 4 hours in ultra pure (99.99%) 40% H$_2$/60% He mixture (at 16.7 psi), these phosphors were found to emit green, blue and orange-red lights, respectively, under 254 nm centered broad UV spectrum excitation of a Hg lamp. Tm-activated phosphors were known to have complicated energy level schemes due to the strong deviation from Russell-Saunders coupling in the (4f) configuration. As a consequence, the relaxation of excited states of the Tm$^{3+}$ ions may take place via a large number of relaxation paths, giving rise to UV, visible, and IR emissions. Therefore, it is difficult to find a host lattice which maximizes only one type of emission with high efficiency.

To generate phosphors of Formula II, the thin-film method discussed above was used to create combinatorial libraries of perovskite aluminates of the formula LnAlO$_{3+\delta}$ doped with rare earth activators. In this procedure, the sputtering targets, which were greater than 99% pure, included La$_2$O$_3$, Y$_2$O$_3$, GdF$_3$, SrCO$_3$, Al$_2$O$_3$, EuF$_3$, Tb$_4$O$_7$, and CeO$_2$. As above, libraries were deposited on single crystal substrates and analyzed as above.

In addition to the combinatorial synthesis methods, the phosphors of Formula II can be made using conventional solid state synthesis methods. Phosphors made by this method were then characterized with regard to their luminescent properties (see, FIG. 1).

B. Inkjet Method

In addition to the thin-film techniques discussed above, it is possible to generate combinatorial libraries using dispensers. In another aspect, this invention resides in a scanning multi-jet delivery system.

Figure 2:
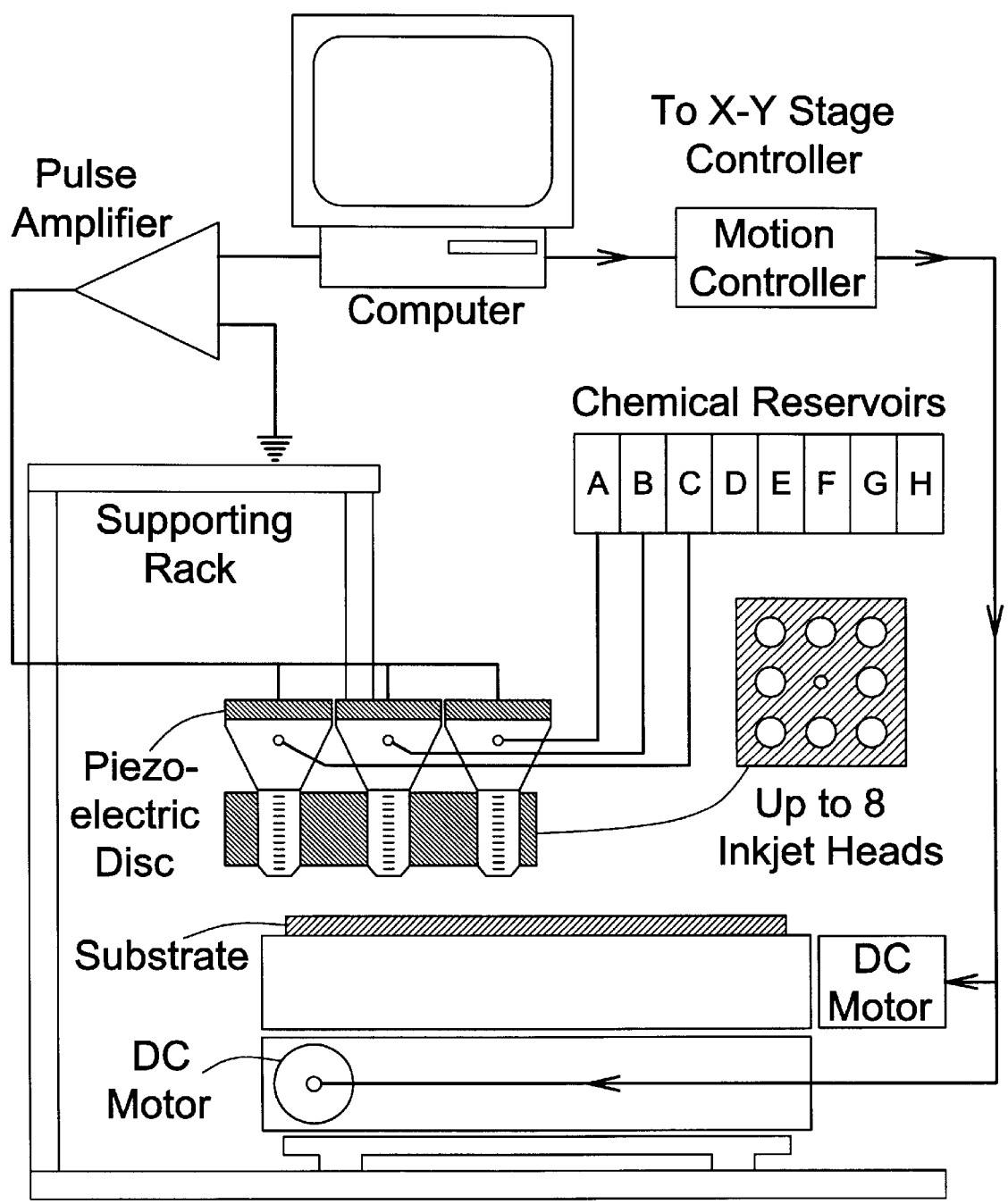
FIG. 2 illustrates a schematic of scanning multihead inkjet delivery system. The system is an integration of multiple single-nozzle inkjets, each of which is a "drop-on-demand" piezoelectric device. Reservoirs filled with the desired solutions are connected via Teflon™ tubing to the pressure chamber of the inkjet. Since the exact droplet weight depends on the nozzle size, waveform of the electrical pulse, individual piezoelectric diaphragm, and nature of solution, calibration is required for each inkjet. The fluctuation of droplet weight for each individual inkjet has been determined to be is less than 1% over extended operating periods as determined with a microbalance.

In order to access libraries of materials from solution phase precursors, a scanning multi-inkjet delivery system (SMID) was developed for generating microscale phosphor libraries (see, FIG. 2).

The inkjet system described herein consists of four "drop-on-demand" piezoelectric inkjets capable of simultaneously delivering about 500 pL size droplets of aqueous inorganic salts at a rate of up to 2 kHz with less than 1% variation in total droplet weight (in range from 100 to 10,000 droplets). In this device, the droplets are jetted from the nozzle according to a change in pressure applied by the piezoelectric device (see, European Patent Application 260 965). By gating the number of electrical pulses applied to the inkjet device, virtually any stoichiometry and composition of solution phase precursors can be delivered to 1 mm diameter reaction wells in a ceramic or single crystal substrate (e.g., Al$_2$O$_3$, MgO, Si, Macor or BN). By coordinating the activation of the inkjets and the movement of a substrate mounted on a motorized x-y stage, a library of solid state precursors can be generated in a two-dimensional array.

Using the dispenser delivery system of this invention, the reactants can be delivered to either a single predefined region on the substrate, or to multiple predefined regions on the substrate.

Using the aforementioned inset system, libraries of rare earth doped aluminates were generated. Precursors, which were greater than 99.9% pure, included aqueous solutions of 0.5 M La(NO$_3$)$_3$, 0.5 M Gd(NO$_3$)$_3$, 0.5 M Al(NO$_3$)$_3$, 0.1 M Eu(NO$_3$)$_3$, 0.04 M Ce(NO$_3$)$_3$ and 0.04 M Tb(NO$_3$)$_3$ containing 15–30% ethylene glycolol (polyethylene imine can also be used) as a humectant. Libraries were processed under O$_2$, H$_2$, He and Ar atmospheres at different temperatures and photoluminescent images were obtained by color photography under broad wavelength UV irradiation.

III. EXAMPLES

Example 1

Synthesis of (Gd$_{2-a}$Zn$_a$)O$_{3-\delta}$:Eu$^{3+}_b$: A series of bulk powder samples of nominal composition GdZn$_a$O$_{3-\delta}$:Eu$^{3+}_{0.04}$ with a ranging from 0 to 1, were synthesized using a conventional solid state synthesis method. Solution precursors having greater than 99.99% purity including aqueous 0.5 M Gd(NO$_3$)$_3$, 0.5 M Zn(NO$_3$)$_2$ and 0.1 M Eu(NO$_3$)$_3$ were mixed in proportion to their mole ratio as given by the formula. The mixture was dried, calcined in air at 900° C. for 12 hours to decompose nitrates to oxides, crushed, finely ground, and then sintered in air at 1400° C. for 10 hours. The powders were again finely ground before the structural and optical spectral measurements.

Figure 3:
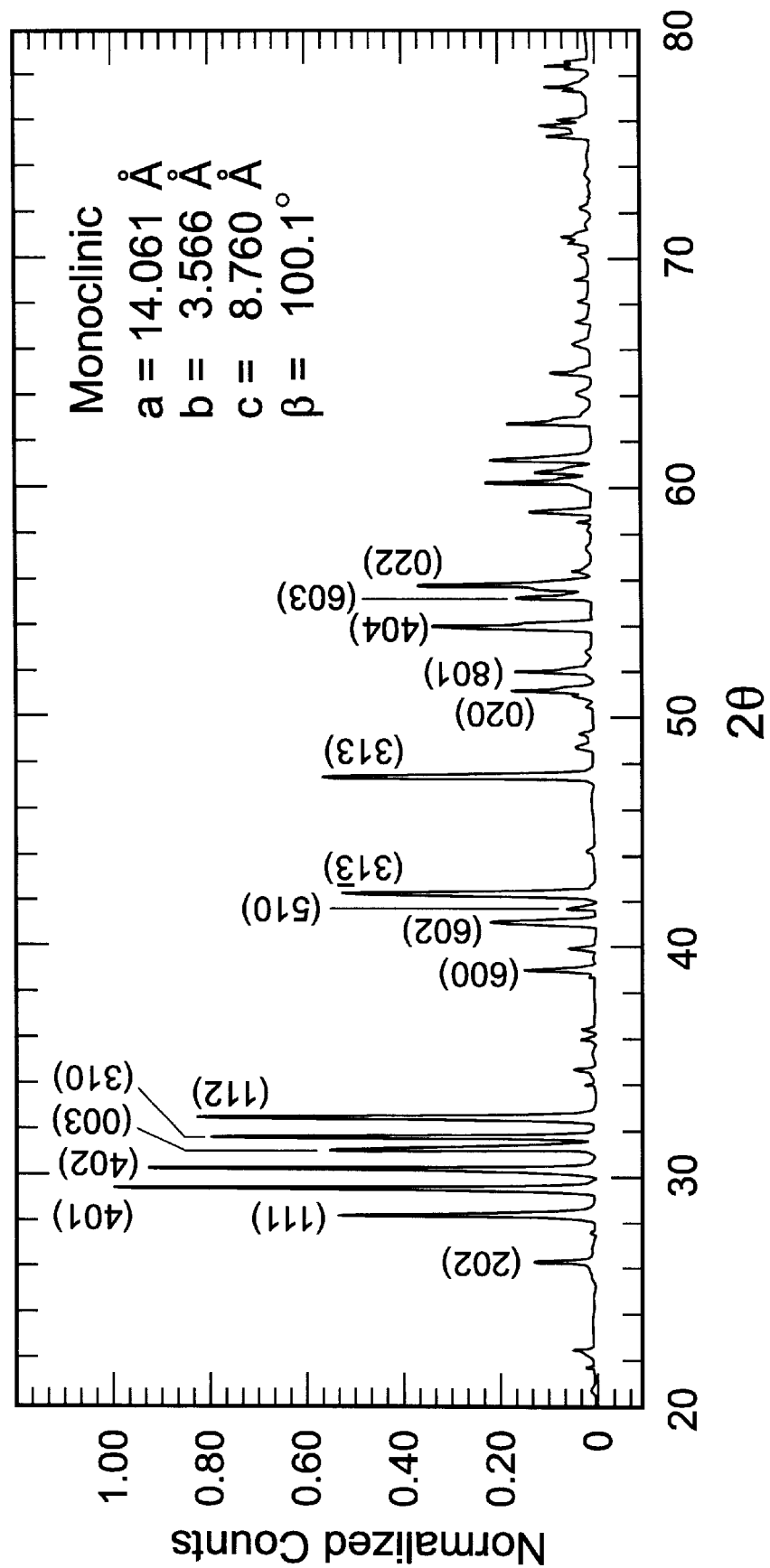
FIG. 3 illustrates a powder x-ray diffraction pattern of nominal compositions $GdZn_aO_{3-\delta}$:$Eu^{3+}{}_{0.04}$. The peaks are indexed to the monoclinic crystal structure of $Gd_2O_3$.

Powder x-ray diffraction (XRD) of nominal compositions Gd$_{2-a}$Zn$_a$)O$_{3-\delta}$:Eu$^{3+}_{0.04}$ were measured with a Simens D5000 x-ray diffractometer with the CuK$_\alpha$ line (1.54 Å). For "a"<0.3, the XRD patterns (see, FIG. 3) show that the samples have the single phase (monoclinic) crystal structure of Gd$_2$O$_3$. The variation in relative peak intensities compared to that of pure Gd$_2$O$_3$ indicated the incorporation of Zn$^{2+}$ in the Gd$_2$O$_3$ lattice. For "a">0.3, a ZnO phase appears as indicated in the XRD patterns. This result indicates that the maximum solubility of Zn$^{2+}$ in Gd$_2$O$_3$ is around m=0.3 with appropriate formula (Gd$_{1.54}$Zn$_{0.46}$)O$_{3-\delta}$:Eu$^{3+}$.

Figure 4A:
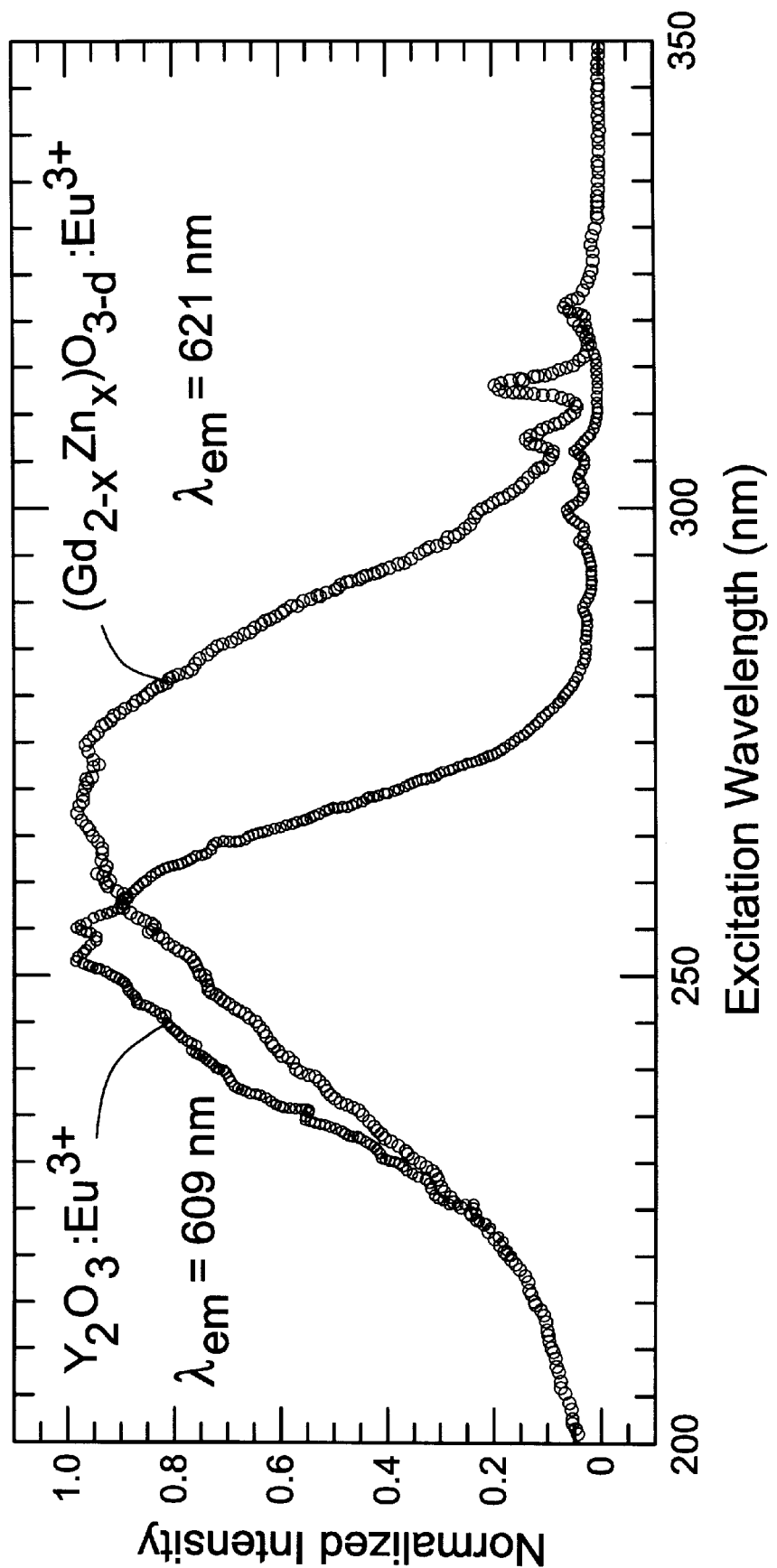
FIG. 4 illustrates photoluminescence excitation (a) and emission (b) spectra of powder samples of $(Gd_{1.54}Zn_{0.46})O_{3-\delta}:Eu^{3+}_{0.06}$ and $Y_2O_3:Eu^{3+}$. Quantum efficiencies (at corresponding ($\lambda^{max}$'s) were measured relative to that of the commercial phosphor $Y_2O_3:Eu^{3+}$ (Q.E.=97%). Thick (~2 mm) compacted powder samples were used in the measurements, and it was determined that there is no UV penetration through the samples. The accuracy in the measurements of quantum efficiencies is ±5%. A set of standard phosphors were measured with this method, and their quantum efficiencies thus determined agree with literature values.
Figure 4B:
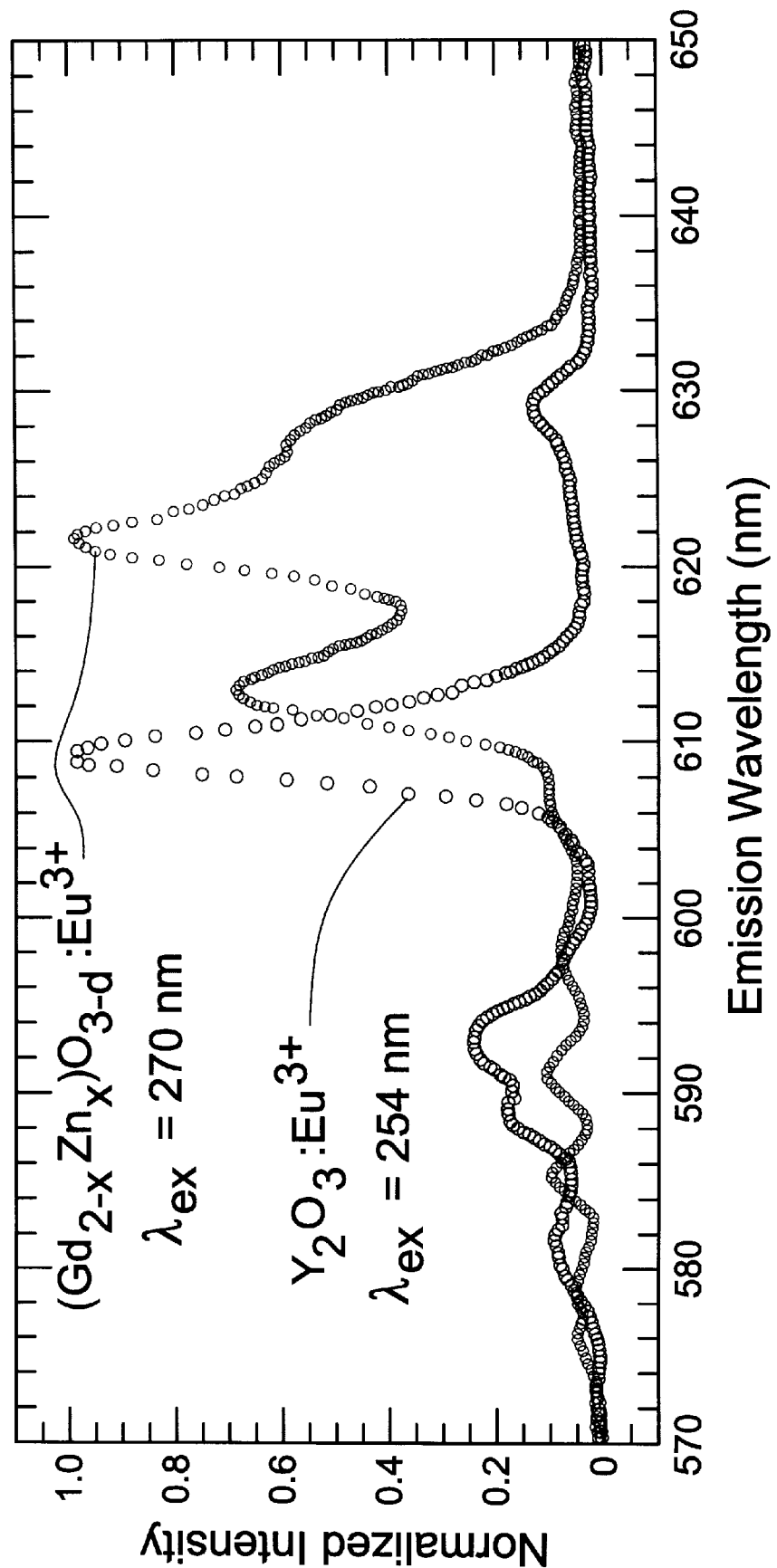

The photoluminescent excitation and emission spectra of (Gd$_{2-a}$Zn$_a$)O$_{3-\delta}$:Eu$^{3+}_b$(0.18<a<1, 0.02<b<0.073) were taken with a F4500 Hitachi spectrophotometer in reflection mode (see FIG. 4). The excitation spectra of (Gd$_{2-a}$Zn$_a$)O$_{3-\delta}$:Eu$^{3+}_b$ (0.18<a<1, 0.02<b<0.073) ($\lambda^{max}\approx$270 nm) are slightly different from that of Y$_2$O$_3$:EU$^{3+}$ ($\lambda^{max}\approx$254 nm) (see, FIG. 4A). This shift can be explained by the higher covalency of Gd$_2$O$_3$ compared to Y$_2$O$_3$ (nephelauxetic effect). The main emission peak of (Gd$_{2-a}$Zn$_a$)O$_{3-\delta}$:Eu$^{3+}_b$ (for a>0.18) is located at 621 nm, with CIE chromaticity (x=0.656, y=0.344) better than that of Y$_2$O$_3$:Eu$^{3+}$ (x=0.642, y=0.358) in color saturation (see, FIG. 4B). This better color saturation is apparent to the naked eye. Quantum efficiencies (Q.E.) and CIE coordinates were calculated by integrating emission counts from the photo-multiplier tube (PMT) detector from 580 nm to 720 mn wavelength range. The Q.E.s were measured relative to the commercial phosphor Y$_2$O$_3$:Eu$^{3+}$ (Q.E. of $\approx$97%) under identical measurement conditions the range of integration (580 nm to 720 nm). The wavelength dependence of the UV lamp output and PMT response were corrected in the analysis. The maximum quantum efficiency of ≈86% was obtained for compound $(Gd_{1.54}Zn_{0.46})O_{3-\delta}:EU^{3+}_{0.06}$ under the current synthesis condition.

Example 2

Quantum efficiencies, illustrated in Table I, are relative to the commercial phosphors, $Y_2O_3:Eu^{3+}$ (red, 100%), $LaPO_4:Tb^{3+}$, $Ce^{3+}$ (green, 100%), and $BaMg_2Al_{16}O_{27}:Eu^{2+}$ (blue, 100%). It is assumed that the differences in the absorption and reflection coefficients are negligible. Thick (>1 mm) compacted powder samples were used in the measurement. The wavelength response of the photomultiplier was corrected. The accuracy of the measurement of quantum efficiency is ±4%. For processing under $H_2$, a 4% partial pressure of $H_2$ in He or Ar was used and total pressure was 2.2 psi; sintering was carried out at the indicated temperatures for 4 to 8 hours.

TABLE I

Properties of optimized tricolor phosphors.

| Sample | Synthesis condition | CIE coordinates | Quantum efficiency |
| --- | --- | --- | --- |
| 1. $GdAlO_{3+\delta}:Eu^{3+}_{0.08}$ (R) | 1400° C. air, 4h | x = 0.613, y = 0.358 | 0.85 |
| 2. $LaAlO_{3+\delta}:Eu^{3+}_{0.08}$ (R) | 1400° C. air, 4h | x = 0.615, y = 0.364 | 0.64 |
| 3. $(Gd_{0.5}Sr_{0.4})AlO_{3+\delta}:Eu^{2+}_{01}$ (G) | 1375° C. $H_2$/He, 6h | x = 0.270, y = 0.586 | 0.97 |
| 4. $(La_{0.5}Sr_{0.4})AlO_{3+\delta}:Eu^{2+}_{01}$ (G) | 1375° C. $H_2$/He, 6h | x = 0.280, y = 0.590 | 0.64 |
| 5. $GdAlO_{3+\delta}:Tb^{3+}_{0.04}$ (G) | 1150° C. $H_2$/Ar, 6h | x = 0.340, y = 0.539 | 0.30 |
| 6. $GdAlO_{3+\delta}:Ce^{3+}_{0.04}:Tb^{3+}_{0.04}$ (G) | 1375° C. $H_2$/He, 6h | x = 0.341, y = 0.554 | 0.34 |
| 7. $LaAlO_{3+\delta}:Tb^{3+}_{0.04}$ (G) | 1150° C. $H_2$/Ar, 6h | x = 0.327, y = 0.421 | 0.08 |
| 8. $LaAlO_{3+\delta}:Ce^{3+}_{0.04}:Tb^{3+}_{0.04}$ (G) | 1375° C. $H_2$/He, 6h | x = 0.311, y = 0.406 | 0.04 |
| 9. $LaAlO_{3+\delta}:Eu^{2+}_{0.16}$ (B) bulk | 1400° C. $H_2$/Ar, 8h | x = 0.158, y = 0.119 | 0.2 |
| 10. $GdAlO_{3+\delta}:Eu^{2+}_{0.16}$ (B) | 1400° C. $H_2$/Ar, 8h | x = 0.155, y = 0.101 | 0.2 |

Quantum efficiencies and CIE coordinates were calculated as in Example 1.

Example 3

In example 3, samples 11–18 (except No. 16) were bulk powder samples. The notation describes the nominal composition and is not meant to indicate lattice sites or an ideal perovskite structure. Quantum efficiencies are relative to the commercial phosphors, $Y_2O_3:Eu^{3+}$ (red, QE=97%), $LaPO_4:Tb^{3+}$, $Ce^{3+}$ (green, Q.E.:93%), and $BaMgAl_{10}O_{17}:Eu^{2+}$ (blue, QE=90%). It was determined that the differences in the absorption and reflection coefficients were small. Thick (>1 mm) compacted powder samples were used in the measurement. The samples were excited with monochromatic light at $\lambda^{max}$ flux determined prior to incidence on samples and the wavelength response of the photomultiplier was corrected. The accuracy in the measurement of quantum efficiency is ±5%. For processing under $H_2$, a 42% partial pressure of $H_2$ in He or Ar was used and the total pressure was 16.7 psi; sintering was carried out at the indicated temperatures for 4 h, yielding largely single phase compounds as determined by x-ray diffraction. In order to quantify the luminescent efficiency of the thin film phosphors, comparative measurements were made with thin film phosphors of known quantum efficiencies.

TABLE II

Properties of optimized tricolor Gd(Sr, La)AlO$_3$ phosphors.

| Sample nominal compositions | Synthesis conditions (° C.), 4 h | Relative quantum efficiency (%) |
| --- | --- | --- |
| 11. $GdAlO_x:Eu^{3+}_{0.06}$ (R) | 1400 air | 85 |
| 12. $Gd_{0.77}Al_{1.23}O_x:Eu^{3+}_{0.06}$ (R) | 1400 air | 98 |
| 13. $GdAlO_x:Th^{3+}_{0.08}$ (R) | 1150 $H_2$/Ar | 31 |
| 14. $Gd_{0.69}Al_{1.31}O_x:Ce^{3+}_{0.28}:Tb^{3+}_{0.041}$ (G) | 1375 $H_2$He | 37 |
| 15. $La_{0.57}Al_{1.43}O_x:Ce^{3+}_{0.23}:Tb^{3+}_{0.034}$ (G) | 1375 $H_2$/He | 5 |
| 16. $La_{0.5}Al_{1.50}O_x:Eu^{2+}_{0.04}$ (B) film | 1375 $H_2$/He | 60 |
| 17. $La_{0.43}Sr_{0.24}Al_{1.33}O_x:Eu^{2+}_{0.10}$ (G) | 1375 $H_2$/He | 60 |
| 18. $(Gd_{0.40}Sr_{0.31})Al_{1.23}O_xF_{1.38}:Eu^{2+}_{0.06}$ (G) | 1375 $H_2$/Ar | 99 |
| 19. $Gd_{0.59}Sr_{0.18}Al_{1.23}O_x:Eu^{2+}0.06$ (G) | 1375 $H_2$/Ar | 90 |

A color photoluminescent image of a series of phosphor libraries with different compositions and different annealing conditions was taken with the aid of a UV lamp. Within the image, it was possible to compare the elemental composition and stoichiometries of the library samples to the corresponding powder samples in Table II. In the image, the sites which correspond to samples 11 and 12 are bright red throughout their respective areas. The site which corresponds to compound 13 is mainly green interspersed with some yellow. The site of compound 14 appears green with hints of blue. The site corresponding to compounds 15 and 16 appear dark blue. The image of the library site which corresponds to compound 17 is green with the edges blending into the background. The library composition site corresponding to compound 18 is dark green throughout its assigned area.

The color image showed the following compositions (a) La(or $GdF_3)_m$ $(Sr)_nAlO_x:Eu_y^{2+/3+}$, where $0.375 \leq m \leq 1$, $0.25 \leq n \leq 0.4$, $1.88 \leq y \leq 12\%$ in atomic ratio annealed at 1150° C. in 10% $H_2$/Ar mixture for 4 hours; (b) same as (a), but anealed at 1400° C. in 40% $H_2$/He mixture for 4 hours; (c) La(or $GdF_3)AlO_x:Tb^{3+}_y$ $(Ce^{3+})Eu_y^{2+/3+}$, where $0.32 \leq m \leq 1$, $1.29 \leq y \leq 6\%$, $0.65 \leq z \leq 4\%$, $1.29 \leq h \leq 8\%$ in atomic ratio, were annealed in air at 1150° C. for 4 hours; (d) same as (c), but anealed at 1400° C. in 40% $H_2$/He mixture for 4 hours; (e) La (or $GdF_3)_m$ $(Sr)_nAlO_x:Eu_y^{2+/3+}$, where $0.178 \leq m \leq 0.714$, $0.17 \leq n \leq 0.4$, $0.75\% \leq y \leq 16.7\%$ in atomic ratio annealed at 1150° C. in 4% $H_2$/Ar mixture for 4 hours. All substrates are 1 inch×1 inch, and each sample site is 1 mm×2 mm; the thin films range from 0.4 $\mu$m to 1 $\mu$m in thicknesses. Sputtering was carried out at $10^{-5}$–$10^{-6}$ Torr base pressure, with Ar sputtering gas and a deposition rate of 0.1–0.5 A/s.

The compositions in each library (a–e), appear in eight columns and 16 rows. Depending on the specific composition at each site, the site appears red, blue, green and variations of dark purple to bluish-green. In some sites, only the black background of the photograph appears. In library "a", there are eight sites wherein 4 of -the 8 sites are identical to compositions at the other 4 sites. The color of each site and its corresponding identical composition site appear to have the same luminescence and chromaticity.

Example 4

The bulk powder of the phosphors in the three categories below were synthesized with a conventional solid state solution synthesis process.

Category (1) $Gd(La)_mSr_nAlO_{3+\delta}$:Eu, and $Gd(La)Sr_nAlO_{3+\delta}F_x$:Eu (green)

(2) $Gd_mAlO_{3+\delta}$:Eu(or Th, Ce) (m≠1) and $Gd_mAlO_{3+\delta}F_x$:Eu (red)

(3) $(Gd_{2-x}Zn_x)O_{3-\delta}$:Eu$^{3+}$ (red)

The aqueous solution of all the elements involved were made with ultrahigh purity nitrate salts (>99.99%), with the molar concentration as follows: 0.5 M La(NO$_3$)$_3$, 0.5 M Gd(NO$_3$)$_3$, 0.5 M Al(NO$_3$)$_2$, 0.5 M Zn(NO$_3$)$_2$, 0.5 M Sr(NO$_3$)$_2$, 0.1 M Eu(NO$_3$)$_3$, 0.04 M Ce(NO$_3$)$_3$ and 0.04 M Tb(NO$_3$). Fluorine was in the form of (NH$_4$)F (0.5 M) aqueous solution. Stoichiometric amounts of each of the solution precursors were mixed according to the cation mole ratio of the desired formula.

Category 1: Synthesis of $GdSrAl_2O_{3+\delta}F_3$:Eu$_{0.08}$, proceeded with the reaction of 4 mL of Gd(NO$_3$)$_3$, 4 mL of Sr(NO$_3$)$_2$, 8 mL of Al(NO$_3$)$_3$, 12 mL (NH$_4$)F and 1.6 mL of Eu(NO$_3$)$_3$, with mixing. After evaporation of the water, the reaction mixture was dried at 200° C. The mixture was calcined at 600° C. for 12 hours in air to decompose the nitrate to its oxides. The resulting powders were then extensively ground, sintered in ultrapure (>99.99%) 40% H$_2$/He mixture (with a total pressure of 2 psi) at 1375° C. for 8 hours. The resulting powder (greenish) was again extensively ground before luminescence measurements were taken. All the phosphors in category (1) can be synthesized utilizing this method.

Category 2: Synthesis of $GdAl_{1.5}O_{3+\delta}$:Eu$_{0.08}$, proceeded with the reaction of 4 mL of Gd(NO$_3$)$_3$, 6 mL of Al(NO$_3$)$_3$, 1.6 mL Eu(NO$_3$)$_3$, with mixing. After evaporation of the water, the mixture was dried at 200° C. The mixture was then calcined at 600° C. for 12 hours in air to decompose the nitrate to its oxides. The resulting powders were then extensively ground, sintered in air at 1400° C. for 8 hours. The resulting powder (white) was again extensively ground before luminescence measurement. All the phosphors in category (2) can be synthesized utilizing this method.

Category 3: Synthesize of $(Gd_{1.5}Zn_{0.5})O_{3-\delta}$:Eu$_{0.08}$, proceeded with the reaction of 6 mL of Gd(NO$_3$)$_3$, 2 mL of Zn(NO$_3$)$_2$, and 2.4 mL of Eu(NO$_3$)$_3$ with mixing. After evaporation of the water, the mixture was dried at 200° C.

Next, the mixture was calcined at 600° C. for 12 hours in air to decompose the nitrate to its oxides. The resulting powders were then extensively ground and sintered in air at 1400° C. for 8 hours. The resulting powder (white) was again extensively ground before luminescence measurement. All the phosphors in category 3 can be synthesized utilizing this method.

Although the invention has been described with reference to preferred embodiments and examples thereof, the scope of the present invention is not limited only to those described embodiments. As will be apparent to persons skilled in the art, modifications and adaptations to the above-described invention can be made without departing from the spirit and scope of the invention, which is defined and circumscribed by the appended claims.

What is claimed is:

1. A phosphor having the empirical formula $$(Gd_{2-a}Zn_a)O_{3-\delta}:EU^{3+}{}_b$$

wherein about 0.0<a<about 2.0; about 0.0<b<about 0.02; and 0≦δ≦1.

2. A phosphor according to claim 1, wherein a is about 0.46 and b is about 0.06.

3. A phosphor according to claim 1, wherein a is about 0.46 and b is about 0.04.

4. A phosphor according to claim 1, wherein said phosphor has a value of x of about 0.656 and a value of y of about 0.344 in emission chromaticity coordinates.

5. A phosphor wherein said phosphor is a member selected from the group consisting of $(Gd_{0.5}Sr_{0.4})AlO_{3+\delta}$:Eu$^{2+}{}_{0.1}$, and $(La_{0.5}Sr_{0.4})AlO_{3+\delta}$:Eu$^{2+}{}_{0.1}$ wherein 0≦δ≦1.

6. A phosphor having the empirical formula $$LnAlO_pF_s:Activator_t$$

wherein Ln is a member selected from the group consisting of $La_mSr_n$ and $Gd_mSr_n$;

Activator is a member selected from the group consisting of Eu$^{2+}$, Eu$^{3+}$, Tb$^{3+}$, Ce$^{3+}$ and mixtures thereof;

the sum of (p+s) is 3+δ;

0<m≦1;

p is greater than or equal to zero;

s is greater than or equal to zero;

0<n<1; 0≦δ≦1; and

0<t<1.

7. A phosphor according to claim 6, wherein Ln is $Gd_mSr_n$ or $La_mSr_n$ and Activator is Eu$^{2+}$.

8. A phosphor according to claim 7, wherein Ln is $Gd_mSr_n$.

9. A phosphor according to claim 7, wherein Ln is $La_mSr_n$.

10. A phosphor wherein said phosphor is a member selected from the group consisting of $La_{0.43}Sr_{0.24}Al_{1.33}O_p$:Eu$^{2+}{}_{0.10}$, $(Gd_{0.40}Sr_{0.31})Al_{1.23}O_pF_{1.38}$:Eu$^{3+}{}_{0.06}$ and $Gd_{0.59}Sr_{0.18}Al_{1.23}O_p$:Eu$^{2+}{}_{0.06}$.

* * * * *

UNITED STATES PATENT AND TRADEMARK OFFICE
CERTIFICATE OF CORRECTION

PATENT : 6,048,469
DATED : April 11, 2000
INVENTOR(S) : Xiang, *et al.*

It is certified that error appears in the above-identified patent and that said Letters Patent is hereby corrected as shown below:

In Column 10, line 19, in the formula, delete "EU" and insert therefor --Eu--.

Signed and Sealed this

Twentieth Day of March, 2001

Attest:

NICHOLAS P. GODICI

*Attesting Officer*   Acting Director of the United States Patent and Trademark Office